Feb. 15, 1938.   N. A. D. THOMPSON ET AL   2,108,456
AUTOMOBILE BODY
Filed May 27, 1936   5 Sheets-Sheet 3
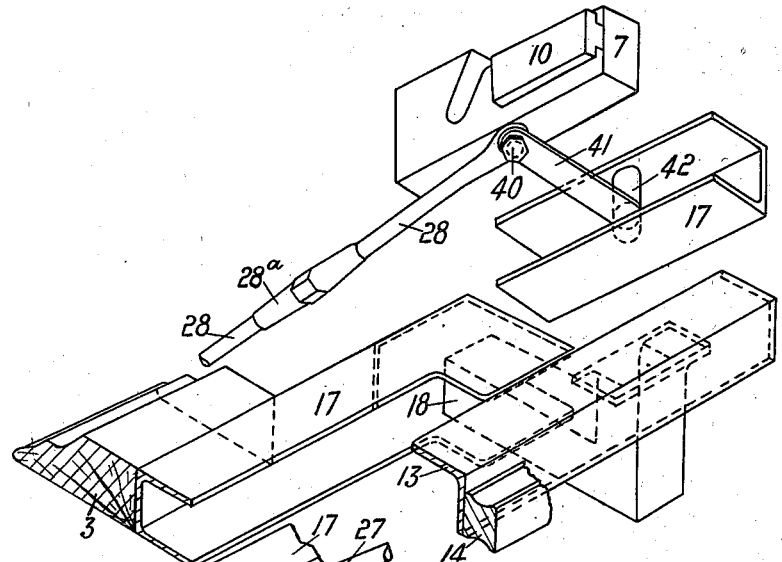
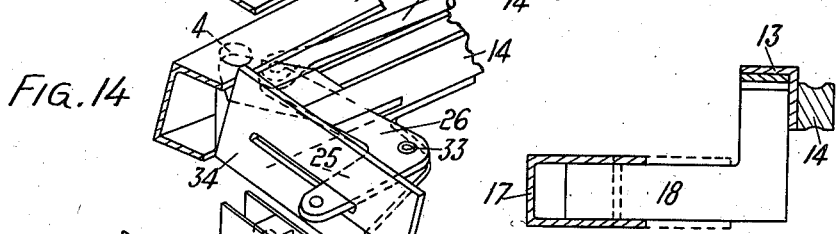
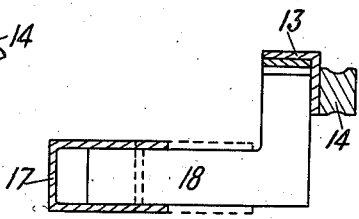
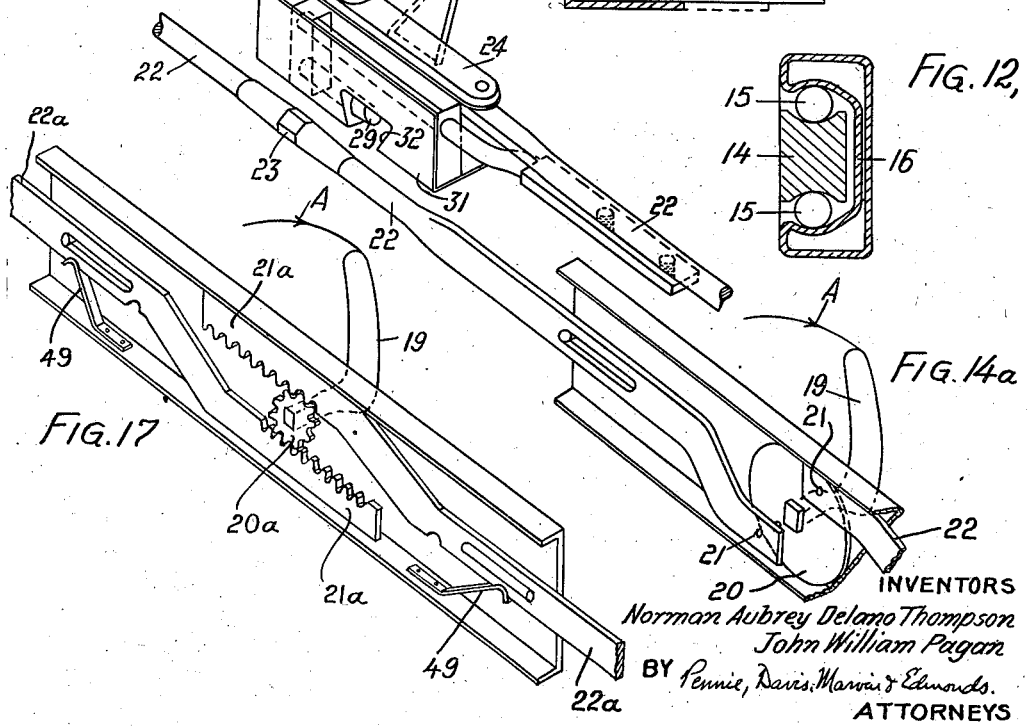
INVENTORS
Norman Aubrey Delano Thompson
John William Pagan
BY Pennie, Davis, Marvin & Edmonds.
ATTORNEYS

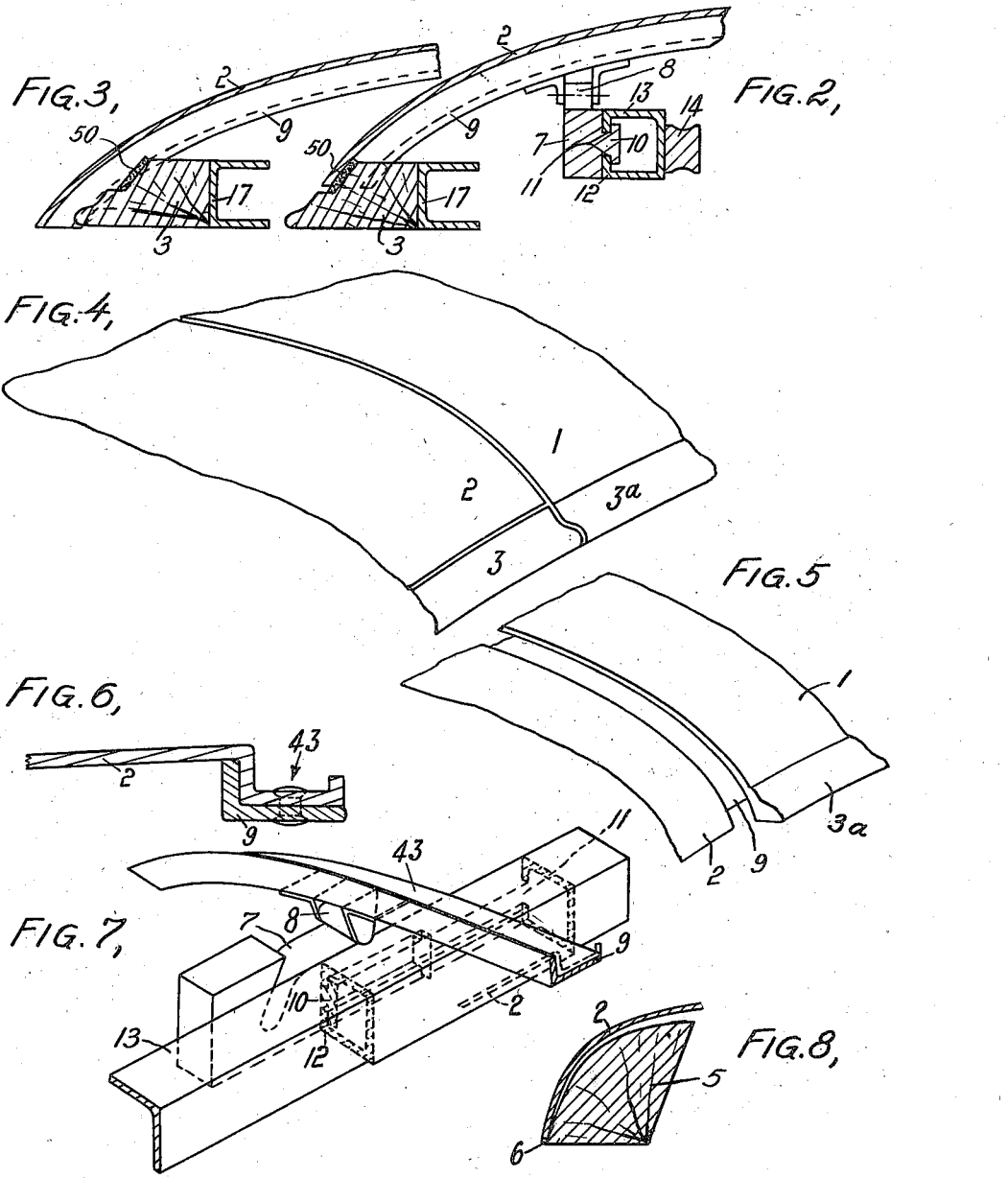

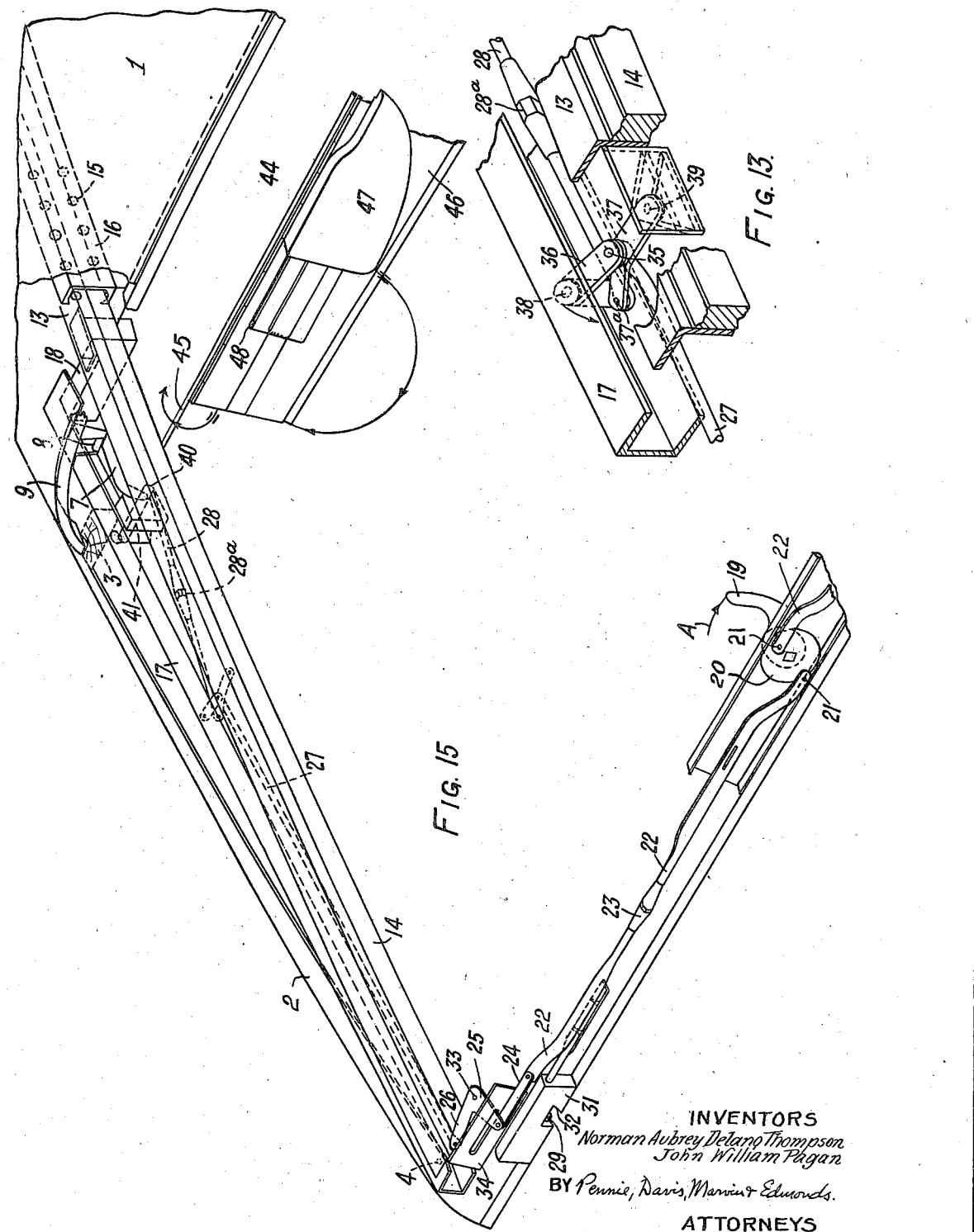

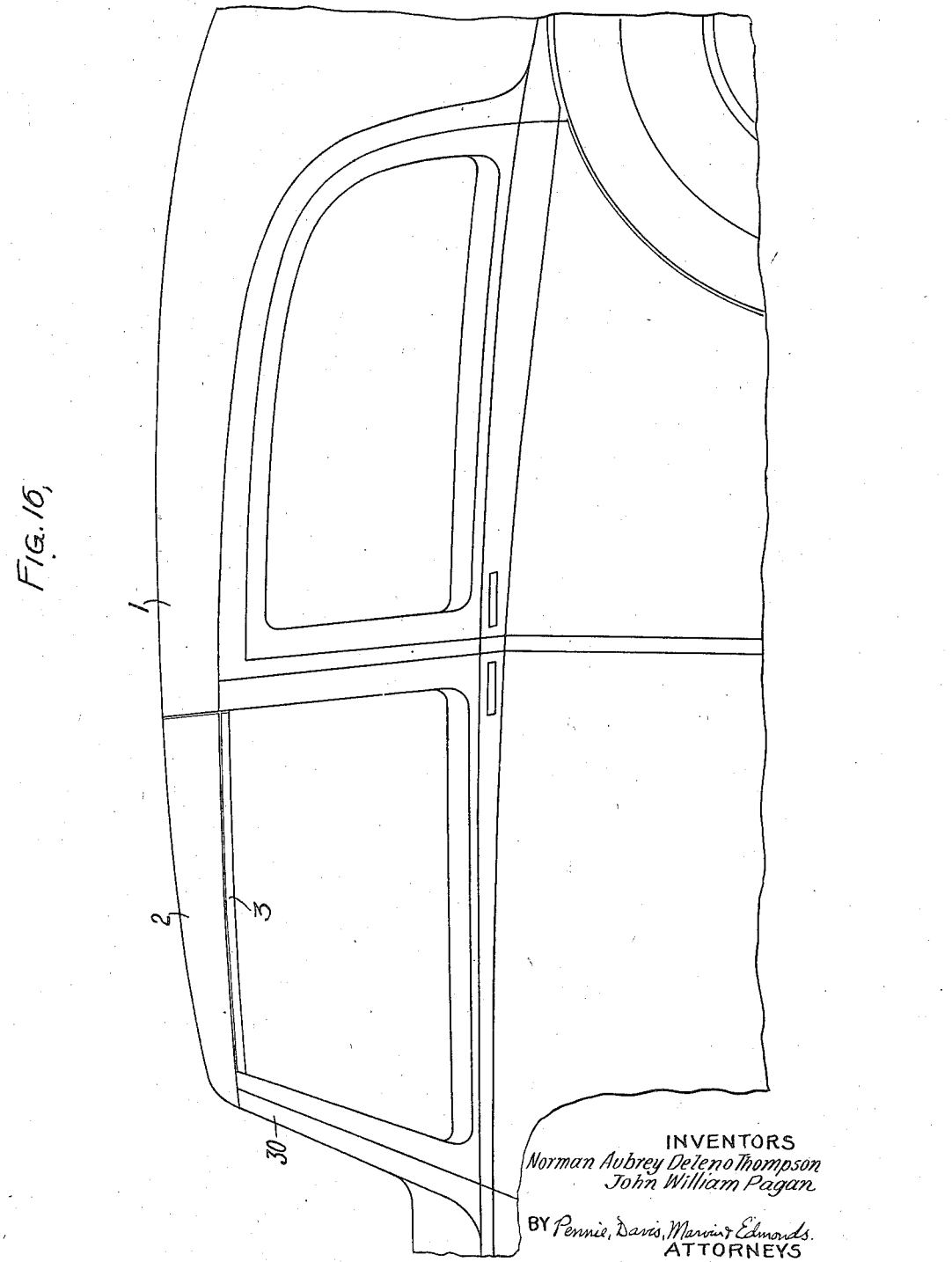

Patented Feb. 15, 1938

2,108,456

UNITED STATES PATENT OFFICE 2,108,456

AUTOMOBILE BODY

Norman Aubrey Delano Thompson and John William Pagan, London, England, assignors to Park, Ward & Company Limited, London, England Application May 27, 1936, Serial No. 82,010
In Great Britain July 23, 1935

9 Claims. (Cl. 296—99)

This invention is concerned with improvements in motor car bodies and more particularly with improvements connected with sliding roofs for such bodies. The invention has for an object to provide an improved construction and arrangement of sliding roof which may be employed to replace the usual sunshine roof in saloon bodies or the usual extension in the form of a leather canopy or in the form of a sliding centre section and folding cantrails in the Sedanca de Ville or Coupé de Ville and like bodies. A more specific object is to provide a sliding telescope de Ville extension complete in itself adapted to be drawn forward as a unit and locked upon the windshield pillars so as to convert a motor body with an open or de Ville front into a sedan or closed type body, rendering the front compartment or de Ville portion waterproof and preserving the same outline of roof sweep and side sweep as the body would have were it an ordinary fixed roof built integral with the rest of the body. Other objects will hereinafter appear.

According to the present invention a horizontally slidable roof panel is provided with cantrails which are retractible in a substantially horizontal plane whereby to permit the slidable panel to be slid underneath a fixed roof panel.

According to a practical construction, the extension or slidable roof panel is formed as a unit complete with cantrails and is supported so that it may be slid horizontally underneath the main portion or fixed roof panel by means of longitudinally extending slides mounted within the framework of the slidable panel and engaging in longitudinally extending guide channels mounted below the fixed panel. The cantrails are pivoted or hinged at their forward ends to the peak rail of the slidable panel so that they may be swung inwards or retracted towards the slides in order to reduce the effective width of the slidable panel to allow it to be slid underneath the fixed panel, or so that they may be swung outwards when the slidable panel is in its forward or closed position to increase the width of the slidable panel.

For the purpose of ensuring guided movement of the cantrails there are preferably attached to the slides at each side laterally extending guide arms engaged by members unitary with the cantrails.

At points remote from their pivots the cantrails are preferably connected to the slides by toggle links or the like operable to effect an increase or a decrease in width. The slidable panel which is preferably hinged along its forward transverse edge to the peak rail may be provided with followers co-operating with ramps or the like movable longitudinally to raise or lower the rear end of the slidable panel, the slides taking the effort when the mechanism for altering the height and width of the slidable panel is operated. With such an arrangement the rear portion of the slidable panel may be adapted to conform to either of two shapes, one of the outline of the main permanent part or fixed roof panel when extended and in use and the other of reduced dimensions allowing it to be slid back when not required underneath the fixed panel wherein it is concealed.

Suitably, the cantrails are each actuated in their width-increasing or reducing movement by a longitudinal rod actuating a horizontal toggle including a pair of links connected to the inside of the cantrail at one end and to the adjacent longitudinal slide at the other end, the links being free to adjust themselves according to the action of their centre joint which is attached to the rod. Thus, when the longitudinal rod is moved in one direction it causes the two outside pivots to converge reducing the distance between them and drawing the cantrails inwards and decreasing the space between the cantrail and the slide. When the longitudinal rod is moved in the reverse direction, said outside pivots of the links are moved apart with the opposite result.

Suitably, the longitudinal rods for actuating the toggles serve also to actuate the sliding ramps or the like so that the cantrails and the ramps are actuated at one time.

In order that the correct relative co-ordinated action may be achieved between the ramps and the toggles by rods actuating both, turn-buckles are preferably incorporated for adjusting purposes in certain or all of the rods.

Preferably, in order that the slidable panel when in use shall be rigidly fixed, two locks are provided, the keepers of which are situated on the windshield pillars and the bolts of which are mounted in the peak rail of the slidable panel in such a position that when the slidable panel is drawn forward for use the bolts are engageable with the keepers.

The locks are suitably operated by a single lever or handle so positioned on the peak rail of the slidable panel that it is readily reached by the driver's hand, and preferably serving not only to lock the slidable panel in position but also to operate the mechanism serving to actuate the cantrails and the ramps or the like. For example, transverse rods carrying the bolts may connect the control handle with longitudinal rods through the medium of bell cranks, said longitudinal rods being connected to the toggles and to the ramps or the like.

In order to bring the slidable panel into position, it is pulled out from its housing below the fixed panel. By a partial rotation of the control handle the cantrails are caused to snap outwards by straightening of the toggles, the slidable panel being at the same time raised at the rear so that it presses upon the underside of the fixed panel and renders the joint watertight.

In order to return the slidable panel to its housing below the fixed panel, the control handle is turned in the opposite direction, thus causing the cantrails to move inwards and permitting the rear end of the slidable panel to drop, and at the same time unlocking the peak rail from the windshield pillars, whereupon the slidable panel may be slid back into its housing.

Rubber or like stops may be provided to limit the rearward movement of the slidable panel.

According to a modification, for the purpose of ensuring guided movement of the cantrails there are attached to the slides at each side laterally extending brackets presenting arcuate slides suitably of dovetail cross section in which dovetail slots in the cantrails engage. Further, the rear end of each cantrail may be connected with an eccentric distance piece by means of a spring arm carrying a follower engaging in a cam slot. When the spring arm is moved inwards for instance the cantrail is swung inwards, the distance piece raised and the effective width and height of the slidable panel reduced.

Both the rear end of the slidable panel and the inside of the fixed panel adjacent to its forward edge may be suitably lined with rubber, so that the pressure exercised by the slidable panel partially compresses both rubber linings together to form a watertight joint.

In order to bring the slidable panel into position it is pulled out from its housing below the fixed panel and locked in suitable manner upon the windshield pillars, pressure is then exerted on the cantrails from inside the car in an outward direction causing them to snap outwards in a movement controlled by the laterally projecting slides. The action of snapping the cantrails outwards causes the distance pieces to raise the slidable panel so that it presses upon the underside of the fixed panel and makes a watertight joint.

In order to return the slidable panel within its housing the cantrails are snapped inwards, causing the rear end of the slidable panel to assume a position in which clearance is provided between the slidable panel and the fixed panel whereupon the slidable panel may be slid back into its housing below the fixed panel.

A vehicle roof construction in accordance with the present invention is illustrated in the accompanying drawings in which:

Figs. 2 and 3 are fragmentary transverse vertical sections on the line a—a of Fig. 1 drawn to a larger scale, and showing a cantrail in normal position, and in retracted position, respectively;

Figs. 4 and 5 are fragmentary perspective views of the junction of the slidable panel with the fixed panel and showing the rear end of the slidable panel in normal position, and in lowered position, respectively;

Fig. 6 is a fragmentary longitudinal vertical section of the rear end of the slidable panel;

Figs. 7 to 14a are fragmentary detail views;

Fig. 15 is a fragmentary perspective view showing the arrangement of the control mechanism;

Fig. 16 is a side elevation of the roof with the slidable panel in extended or closed position.

Fig. 17 is a modification of part of the control mechanism shown in Fig. 15.

Figure 1:
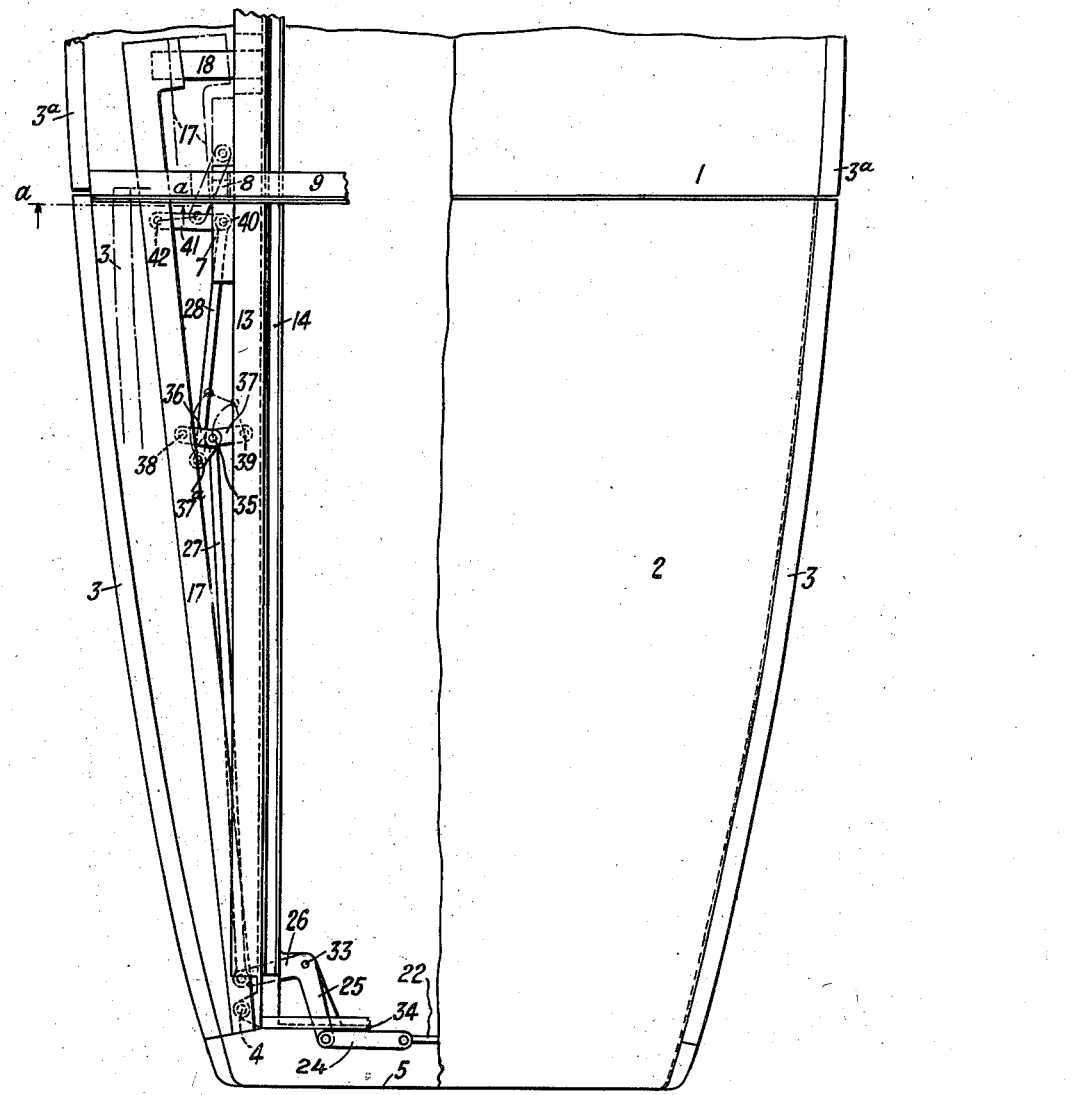
Fig. 1 is a plan view of the slidable roof panel with one side of the covering omitted to show the mechanism thereunder.

Referring first to Figs. 1 and 16, the vehicle roof shown comprises a fixed roof panel 1 and a horizontally slidable roof panel 2 provided with retractible cantrails 3 extending one along each longitudinal edge of the panel 2. Each cantrail 3 is pivotally connected at 4 at its forward end to a peak rail 5 of the panel 2 whereby the cantrails may be swung inwardly, i. e. retracted, and swung outwardly to normal position, about the pivots 4, in a substantially horizontal plane. The peak rail 5 is connectible, when the panel 2 is extended, i. e., closed, with windshield pillars 30 (Fig. 16). The panel 2 is connected at its forward edge to the peak rail 5 by a horizontal hinge 6 (Fig. 8) whereby to permit the rear end of the panel 2 to be slightly lowered and raised, out of and into alignment, respectively, with the panel 1, the panel 2 being in extended position.

The arrangement is such that, when the cantrails 3 are retracted and the rear end of the panel 2 lowered out of alignment with the panel 1, the panel 2 may be slid horizontally under the panel 1, and accommodated wholly and concealed below the panel 1, until required.

The panel 2 (Figs. 2, 7 and 9) is supported at its rear end on a pair of ramps 7 disposed one near each side of the panel 2, and slidable longitudinally of the roof to effect lowering and raising movements of said rear end, each ramp 7 engaging a follower 8 mounted on the underside of an angle-bar 9 attached to the rear end of the panel 2. Each ramp 7 is unitary with a T-shaped guide 10 slidable in a guide slot 11 in a guide 12 forming part of a longitudinal bar 13 attached at its forward end to the peak rail 5 and extending rearwardly for some distance beyond the rear end of the panel 2. Attached to the inner side of the bar 13 (Figs. 12 and 15) is a slide-bar 14 extending from the forward end of the panel 2 rearwardly to a point beyond the rear end of the panel 2 and slidable in ball bearings 15 in a guide channel 16 fixed below the panel 1. Each cantrail 3 is carried by a channel bar 17 of which the forward end is connected to the respective pivot 4 and which extends rearwardly beyond the rear end of the panel 2 and slidingly engages at its rear end a horizontal guide arm 18 projecting outwardly from and attached to the adjacent longitudinal bar 13. The cantrails 3 and the ramps 7 are so operatively interconnected that retraction of the cantrails is accompanied by lowering movement of the rear end of the panel 2, and return movement of the cantrails is accompanied by upward movement of the rear end of the panel 2.

In the arrangement illustrated the cantrails and the ramps are controllable by manipulation of a control handle 19 (Figs. 14, 14a and 15) mounted on the peak rail 5 and carrying a crank disc 20 operatively connected to each cantrail 3 and the associated ramp 7 by mechanism including a crank pin 21, a rod 22 incorporating a turnbuckle 23, a link 24, a bell-crank 25, 26, a rod 27, and a rod 28. The rod 22 extends transversely of the roof adjacent to the peak rail 5. The rod 22 is connected to a locking bolt 29 engageable with a keeper (not shown) mounted on the adjacent windshield pillar 30 whereby to lock the peak rail 5 to said pillar, the bolt 29 being mounted in a guide member 31 attached to the peak rail 5 and presenting a dovetail gap 32 adapted to receive the keeper which is adapted to mate therewith and thus to locate the peak rail 5 against tranverse shift. The bell-crank 25, 26 is pivoted at 33 to a corner bracket 34 attached to the peak rail 5 and carrying also the pivot 4 of the adjacent cantrail. The arm 26 of the bell-crank is articulated to the forward end of the rod 27 which lies between the bars 13 and 17 and which is articulated at its forward end to a toggling pivot 35 (Fig. 13) interconnecting a pair of toggle links 36, 37 of which the link 36 is articulated at 38 to the bar 17 and of which the link 37 is articulated at 39 to the bar 13. An extension of the link 37, beyond the pivot 35, is articulated at 37a to the forward end of the rod 28 which lies also between the bars 13 and 17 and which is pivoted at 40 at its forward end to the respective ramp 7. The rod 28 incorporates a turnbuckle 28a. Connected to the pivot 40 (Figs. 1, 9 and 15) is one end of a link 41 of which the other end is pivoted at 42 to the bar 17.

When the panel 2 is in extended or closed position and the control mechanism disposed as shown in full lines in Fig. 1, the cantrails 3 are aligned with the complementary cantrails 3a of the panel 1 and the panel 2 constitutes, in effect, an uninterrupted roof extension of the same sweep and contour as the panel 1, as shown in Fig. 16. When in the extended position, the panel 2 rests against a rubber strip 50 fastened along the cantrail 3 to make a watertight and noiseless joint. The downwardly stepped rear end 43 (Figs. 6 and 7) of the panel 2 engages under the forward end of the panel 1 and forms thereat, under the pressure of the ramps 7, a watertight joint, while the peak rail 5 is locked to the windshield pillars 30 by the engagement of the bolts 29 and of the gaps 32 with the keepers. To permit opening of the panel 2, the cantrails 3 are retracted and the rear end of said panel 2 lowered out of alignment with the panel 1, as shown in Figs. 3 and 5, by imparting a partial forward rotation in the direction indicated by the arrow A to the control handle 19, after which the panel 2 may be slid rearwardly into concealed position below the panel 1. Actuation of the control handle 19 to permit opening of the panel 2 effects, simultaneously withdrawal of the bolts 29 from locking engagement with their keepers so as to unlock the peak rail 5 from the windshield pillars 30, operation of the toggle link assemblies 35—39 to retract the cantrails 3 to the position shown in chain-dotted lines in Fig. 1, and rearward displacement of the ramps 7 to allow the rear end of the panel 2 to drop out of alignment with the panel 1.

The modification shown in Fig. 17 is the mechanical equivalent of the arrangement of Fig. 14a wherein the crank disc 20 and pins 21 correspond to the pinion 20a and racks 21a of Fig. 17. It will be noted in Fig. 17 that spring detents 49 are provided to fall into suitable grooves in the arms 22a so as to lock the arms at the two extremes of movement.

When in open or concealed position, the panel 2 is accommodated within a compartment 44 (Fig. 15) formed between the panel 1 and a ceiling board 45 spaced below said panel 1. The forward end of the compartment 44 is closed normally by a door 46 hinged along one horizontal edge to the ceiling board 45 and including at each end a flap 47 hinged vertically at 48 to the door 46. The door 46 is openable downwardly and, after withdrawal of the panel 2 to extended or roof-closed position, the flaps 47 are swung inwardly against the inside face of the door 46, thus permitting the door 46 to be restored to closed position.

We claim:

1. In a structure of the character described, windshield posts, and an auxiliary roof portion comprising a peak rail, a panel hinged to the peak rail at its forward end, a bar extending longitudinally adjacent the undersurface of the panel, a ramp slidably mounted on the bar for raising and lowering the rearward end portion of the panel, a cantrail, a toggle mechanism secured to the cantrail and to the longitudinally extending bar for extending and retracting the cantrail, locking means for engaging the auxiliary roof portion with the windshield posts and for disengaging it therefrom, and means comprising a control crank mounted on the peak rail, a bell crank, a rod connecting the control crank and the bell crank, and a rod connecting the bell crank and the toggle mechanism for simultaneously actuating the ramp, the toggle mechanism, and the locking means.

2. A vehicle roof including a main roof portion and an auxiliary roof portion slidable with respect to said main roof portion, said auxiliary roof portion including a peak rail, a panel hinged at its forward edge to said peak rail, cantrails pivotally mounted on the auxiliary roof portion for movement substantially in a horizontal plane, mechanical operating means for swinging the panel of the auxiliary roof portion about its hinge to raise and lower the panel, mechanical operating means for extending and retracting the cantrails, and common actuating means operatively connected with both the panel operating means and with the cantrail operating means whereby actuation of the actuating means simultaneously raises the panel of the auxiliary roof portion and extends the cantrails or simultaneously lowers said panel and retracts the cantrails.

3. A vehicle roof in accordance with claim 2 in which said common actuating means comprises a control handle mounted on the peak rail.

4. A vehicle roof including a main roof portion and an auxiliary roof portion slidable with respect to said main roof portion, said auxiliary roof portion including a peak rail, a panel hinged at its forward edge to said peak rail, cantrails pivotally mounted on the auxiliary roof portion for movement substantially in a horizontal plane, a slidable ramp for swinging the panel of the auxiliary roof portion about its hinge to raise and lower the panel, a toggle mechanism connected to each cantrail for extending and retracting the cantrails, and common actuating means operatively connected with the ramp and toggle mechanism whereby actuation of the actuating means simultaneously raises the panel of the auxiliary roof portion and extends the cantrails or simultaneously lowers said panel and retracts the cantrails.

5. A vehicle roof including a main roof portion and an auxiliary roof portion slidable with respect to said main roof portion, said auxiliary roof portion including a peak rail, a panel hinged at its forward edge to said peak rail, cantrails pivotally mounted on the auxiliary roof portion for movement substantially in a horizontal plane, mechanical operating means for swinging the panel of the auxiliary roof portion about its hinge to raise and lower the panel, mechanical operating means for extending and retracting the cantrails, windshield posts, locking means for locking the peak rail to and unlocking it from the windshield post, and common actuating means operatively connected with the panel operating means and with the cantrail operating means and with said locking means whereby actuation of the actuating means simultaneously raises the panel of the auxiliary roof portion and extends the cantrails and locks the peak rail to the windshield posts or simultaneously lowers said panel and retracts the cantrails and unlocks the peak rail from the windshield posts.

6. A vehicle roof including a main roof portion and an auxiliary roof portion slidable with respect to said main roof portion, said auxiliary roof portion including a peak rail, a panel hinged at its forward edge to said peak rail, cantrails pivotally mounted on the auxiliary roof portion for movement substantially in a horizontal plane, a slidable ramp for swinging the panel of the auxiliary roof portion about its hinge to raise and lower the panel, a toggle mechanism connected to each cantrail for extending and retracting the cantrails, windshield posts, locking means for locking the peak rail to and unlocking it from the windshield posts, and common actuating means operatively connected with the ramp and with the toggle mechanism and with said locking means whereby actuation of the actuating means simultaneously raises the panel of the auxiliary roof portion and extends the cantrails and locks the peak rail to the windshield posts or simultaneously lowers said panel and retracts the cantrails and unlocks the peak rail from the windshield posts.

7. In a structure of the character described, an auxiliary roof portion comprising a panel, a bar extending longitudinally adjacent the undersurface of the panel, a cantrail pivotally mounted for movement substantially in a horizontal plane, a toggle mechanism connected to the cantrail and to the longitudinally extending bar, and a control handle operatively connected with the toggle mechanism to extend and retract the cantrail.

8. In a structure of the character described, an auxiliary roof portion comprising a panel hingedly mounted at its forward edge, a slidably mounted ramp located under the rear portion of the panel for swinging it around its hinge to raise and lower the rearward portion of the panel, a bar extending longitudinally adjacent the undersurface of the panel, a cantrail pivotally mounted for movement substantially in a horizontal plane, a toggle mechanism connected to the cantrail and to the longitudinally extending bar, and common actuating means operatively connected with both the toggle mechanism and the ramp whereby actuation of the actuating means simultaneously raises the panel and extends the cantrail or simultaneously lowers the panel and retracts the cantrail.

9. In a structure of the character described, windshield posts, and an auxiliary roof portion comprising a peak rail, a panel hinged to the peak rail at its forward end, a bar extending longitudinally adjacent the undersurface of the panel, a ramp slidably mounted on the bar for swinging the panel about its hinge to raise and lower the rearward end portion of the panel, a pivoted cantrail, a toggle mechanism secured to the cantrail and to the longitudinally extending bar for extending and retracting the cantrail, locking means for locking the auxiliary roof portion to and unlocking it from the windshield posts, and common actuating means operatively connected with the ramp and with the toggle mechanism and with said locking means whereby actuation of the actuating means simultaneously raises the panel of the auxiliary roof portion and extends the cantrail and locks the auxiliary roof portion to the windshield posts or simultaneously lowers the panel and retracts the cantrail and unlocks the auxiliary roof portion from the windshield posts.

NORMAN AUBREY DELANO THOMPSON.
JOHN WILLIAM PAGAN.